UNITED STATES PATENT OFFICE.

HERBERT HAAS, OF SAN FRANCISCO, CALIFORNIA.

PROCESS OF EXTRACTING IRON FROM ITS ORES.

1,156,775.  Specification of Letters Patent.  Patented Oct. 12, 1915.

No Drawing.  Application filed October 20, 1913.  Serial No. 796,227.

*To all whom it may concern:*

Be it known that I, HERBERT HAAS, a citizen of the United States, residing at San Francisco, in the county of San Francisco and State of California, have invented new and useful Improvements in Processes of Extracting Iron from its Ores, of which the following is a specification.

This invention relates to a new process of making iron and steel direct from the iron ore without first converting it into pig iron in the iron-blast furnace, as is done at present, and then using the pig iron as the raw material, either in the molten state or as bars, in the manufacture of steel.

My process consists in smelting the iron ores, (hematite or magnetite, calcined spathic iron ore, or the like) with the necessary fluxes, in a reverberatory or a regenerative furnace, preferably of the tilting type, with a basic lining. The furnace is heated by gas or by fuel oil. In order to prevent the rapid corrosion of the furnace lining, a bath of molten iron is kept in the furnace hearth, so that the corrosion of the lining from the molten iron oxids is confined to as small an area as possible. In order to melt the iron oxids more readily, they are preferably crushed and pulverized, so as to offer as large a surface as possible to the heat-radiating roof of the furnace, and so that they will rapidly spread over the entire metal bath and be quickly melted. When a sufficient amount of molten oxid of iron has been accumulated in the furnace, vaporized fuel oil is forced through the molten oxid of iron, the oxygen of which combines with the carbon and hydrogen in the petroleum, forming carbon dioxid and monoxid gases and water, thus reducing the iron.

Before entering into a further description of the apparatus used for carrying out the above process, I wish to point out that, since into the iron oxid in a molten condition, and at such a high temperature, viz.: about 1600° C., is forced the reducing agent in the finely divided form of a vapor, the contact surface of the reacting substances is increased a millionfold, so that the chemical mass action is correspondingly increased and accelerated. The use of the reagent under these conditions corresponds therefore closely to the theoretical requirements, and a great economy is effected.

For carrying on the process of melting the iron oxids and reducing them there may be provided a tilting furnace having a row of twyer pipes on one of its sides, preferably all at the same height. This row of twyer pipes would always be above the highest point to which the bath of iron oxid would reach during the smelting operation. In these twyer pipes are placed atomizers, properly insulated and protected with a refractory material to be able to withstand the high heat of the molten iron oxid, and which atomizers, being removable fittings, can be easily removed, examined, repaired and replaced. The petroleum, crude oil, fuel oil, or a liquid hydrocarbon is completely atomized or vaporized by subjecting it to a high pressure, or high temperature, or both, before the oil passes off through the atomizing nozzle. Evaporation of the oil at the high temperature is prevented by keeping it in the oil heaters and containers under pressure, but, at the instant it is released at the nozzle orifices, it is vaporized. This practice makes it possible to use oil fuel, not only for smelting the iron ore, but also for reducing it.

While the process of forcing the atomized or vaporized oil through the molten iron oxid is going on, firing of the furnace, either by oil or gas fuel, would not be interrupted, for the following reasons which reasons will also explain the necessity of vaporizing or atomizing the oil: When it is desired to use fuel oil for reducing the molten iron oxid, it is especially necessary to have the oil as completely as possible vaporized, as it not only requires much heat to break up most hydrocarbons into their constituent elements, hydrogen and carbon, but when iron oxid reacts with either carbon or hydrogen, heat is absorbed. That is, while the carbon burning either to carbon monoxid or carbon dioxid produces heat, and likewise, hydrogen burning to water (in the gaseous state) produces heat, the heat of dissociation of $Fe_2O_3$, is greater than the heat produced by the oxygen (combined with the iron) combining with the carbon and hydrogen introduced. Moreover, much heat will be carried away by the resulting hot waste gases. To illustrate this point, instead of using the complex hydrocarbon compounds of the liquid fuels, composed of the paraffin series, $C_nH_{2n+2}$; olefin series $C_nH_{2n}$ and acetylene series $C_nH_{2n-2}$, we will use methane, $CH_4$, the principal constituent of natural gas. When petroleum, crude oil, or oil residue is heated in a retort, for example, and is gasified at a high temperature with exclusion of air, a portion of its carbon is deposited in the retort, and the remaining gases will be chiefly saturated hydrocarbons, of the $C_nH_{2n+2}$ series, with methane its chief constituent. By heating the oils under high pressure, however, this evaporation of a portion of the hydro-carbons with depositing of carbon is prevented, and the gasifying and splitting up of the oil does not take place before the oil issues from the atomizing nozzle, so that all of the oil is used up. But for the purposes of illustrating the entire reaction 1, that of methane, which will be the principal constituent of the resulting oil gas, may serve as representing one of the principal reactions taking place. To split it up into carbon and hydrogen 22,250 calories are necessary.

Reaction 1.

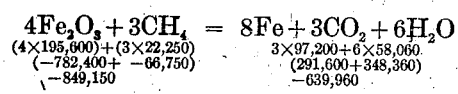

Thus 209,190 calories are absorbed. In addition, the 133.3 cbm. of water (gas) formed, heated to 1600° C. would carry off 123,722 calories, and the 66.66 $CO_2$ gas, 77,000 calories more, or a total of 200,722 calories in the gases, which in addition to the heat absorbed in the reaction at zero° C., would bring the total heat absorption to nearly 410,000 calories. The heat in the molten oxids of iron $4Fe_2O_3 = 4 \times 160 \times 713 = 456,320$ calories, would leave only a balance of a little over 46,000 calories, which would lower the temperature of the resulting (448 kg.) of iron reduced considerably below its melting point, there being a deficiency of nearly 92,500 calories to keep the iron at 1600° C., or about 206 calories per 1 kg. of iron, or 145 calories per 1 kg. $Fe_2O_3$ taking part in this reducing reaction.

If the carbon in the above reaction (1) is only burned to CO, carbon monoxid, as follows (reaction 2):

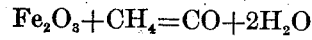

there would be a still greater deficiency of heat to make the process self-supporting (without the addition of heat from an outside source), 420 calories per 1 kg. Fe, and 292 kg. calories per 1 kg. $Fe_2O_3$ being required in addition to what is realized from the reaction 2, whereas in reaction 1, burning the C to $CO_2$ this deficiency would only be 145 calories per 1 kg. $Fe_2O_3$ and 206 calories per 1 kg. iron. With liquid hydrocarbons conditions are even worse, that is, more heat would be absorbed in the reaction, so that a liquid fuel, coming in contact with the iron oxid (under exclusion of air), would act very much like a stream of cold water, and freeze the iron oxid to a solid mass, almost the instant it comes in contact with it.

By heating the oil under pressure and forcing it out through an atomizer, it would pass into the vaporous state immediately when released. By limiting the amount of oil that is so vaporized to a relatively very small quantity compared with the large body of molten material stored in the furnace, and having each point at which the vaporized oil is introduced into the furnace surrounded by a relatively very much larger surface of molten iron or iron oxid, the large quantity of molten metal or metallic oxid can exchange and give off a portion of its heat and transmit it to the metal that is being chilled in proximity to the oil atomizer, and thus avoid its freezing. The greater the difference of temperature between the metal that is being chilled by the action of the oil upon it and the metal surrounding it, the more rapid will be this heat exchange. In a large furnace, a number of such atomizers would be spaced as far apart as possible so as not to confine this chilling action to one localized area, and have its intensity nullified by reducing the amount introduced at any one point to a rate which will permit of any heat deficiency in the process of reduction being taken care of by the heat transmitted from the large body of molten material in the furnace. The firing of the furnace is proceeded with simultaneously as the process of reducing the iron oxids to iron is going on, keeping the metal bath at a high temperature.

To make the above remarks clearer, a numerical example will easily illustrate the point. Assuming that we have 50 (metric) tons of molten iron oxid in the furnace, and 50 (metric) tons of molten iron, at about 1600° C., we would have contained in the iron oxid some 35,650,000 calories, and in the iron 15,500,000 calories, or a total of 51,150,000 calories. With a deficiency of approximately 150,000 calories per 1 (metric) ton of iron oxid during the process of reduction, this would represent slightly more than 0.3% of the total heat capacity of the molten material stored in the furnace. If 10 tons of $Fe_2O_3$ were to be reduced per hour, or 167 kg. per minute, only about 3% of the total heat stored in the molten materials would have to be exchanged and given off. With 1,500,000 calories per bbl. of fuel oil, and a 25% furnace efficiency, 4 bbls. of oil would have to be burned to make up this deficiency, or 0.4 bbl. per ton of iron oxid. This would, of course, be in addition to the fuel oil used to smelt the iron ore and fluxes and convert them into the molten liquid state, initially, before the process of reducing the iron oxids to iron would begin.

After the iron oxids have been reduced to iron, a portion of it may be transferred to another furnace, and finished into steel by usual refining or recarburizing processes, if it is not desired to finish the reduced iron and convert it into steel in the same furnace. To reduce the fuel consumption, and facilitate the smelting of the iron ore and fluxes, as has already been explained above, it is desirable to maintain a bed of molten iron always in the hearth, and remove only a portion of this iron or steel, and on top of the remaining bath charge fresh iron ore and fluxes, repeating the above described operations.

I claim:—

1. The process of making iron or steel which consists in smelting, without first reducing, iron ores with necessary fluxes, and then forcing through the molten mass finely divided oil.

2. The process of making iron or steel which consists in smelting, without first reducing, iron ores with necessary fluxes, and then forcing through the molten mass oil that has been finely divided by subjecting it to a high pressure and forcing it through a small aperture.

3. The process of making iron or steel which consists in smelting, without first reducing, iron ores with necessary fluxes, and then forcing through the molten mass oil that has been finely divided by subjecting it to a high temperature and forcing it through a small aperture.

4. The process of making iron or steel which consists in smelting, without first reducing, iron ores with necessary fluxes, and then forcing through the molten mass oil that has been finely divided by forcing it at a high pressure and temperature through an atomizer.

5. The process of making iron or steel by smelting iron ores with necessary fluxes without first reducing the oxids and forcing through the molten iron oxids while they are in the liquid molten state petroleum at a temperature above its ordinary flashpoint and preventing its evaporation before it is released by keeping it in the heater and container under pressure sufficiently high, so that all of the petroleum will remain a liquid while in the heater and container, but will be transformed into a finely atomized vapor as soon as it issues from the atomizer orifice.

In testimony whereof I have hereunto set my hand in the presence of two subscribing witnesses.

HERBERT HAAS.

Witnesses:
 FRANCIS M. WRIGHT,
 D. B. RICHARDS.